Sept. 20, 1927.
O. G. LUYTIES
1,643,021
CONSTRUCTION OF PIPES AND THE LIKE
Filed March 1, 1920
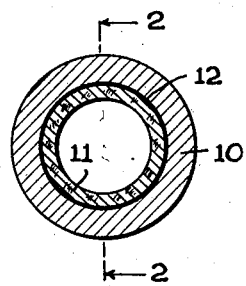
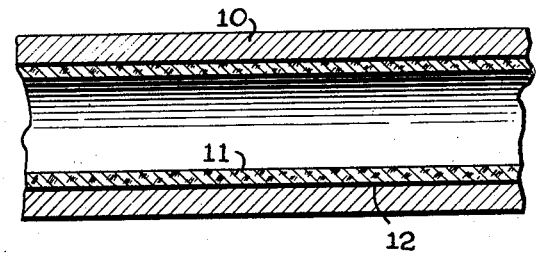
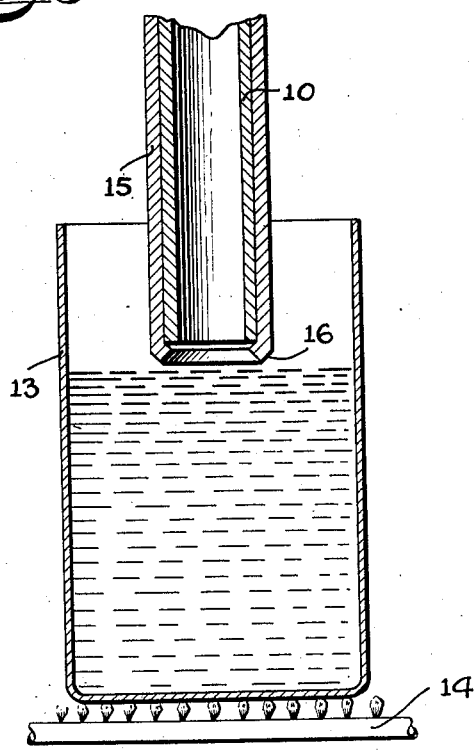

Patented Sept. 20, 1927.

1,643,021

UNITED STATES PATENT OFFICE.

OTTO G. LUYTIES, OF NEW YORK, N. Y.; HILDA M. RIDDER AND GUSTAV A. LANZKA ADMINISTRATORS OF SAID OTTO G. LUYTIES, DECEASED.

CONSTRUCTION OF PIPES AND THE LIKE.

Application filed March 1, 1920. Serial No. 362,590.

This invention relates to the construction of pipes and the like. One of the objects thereof is to provide a simple and practical construction for pipes and the like which is especially adapted to meet efficiently conditions of use. Another object is to provide a construction of the above type adapted to withstand without injury the freezing of its contents. Another object is to provide a practical art whereby constructions of the above type may be readily and cheaply made. Other objects will be in part obvious and in part pointed out hereinafter.

The invention accordingly consists in the features of construction, combinations of elements and arrangement of parts, and in the several steps and relation and order of each of the same to one or more of the other steps, all as will be illustratively described and the scope of the application of which will be indicated in the following claims.

In the accompanying drawings in which is shown one of various possible embodiments of the mechanical features of this invention and a step of the above art, Figure 1 is a cross section of a pipe;

Figure 2 is a longitudinal section taken along the line 2—2 of Figure 1; and

Figure 3 illustrates a step of the above art.

Similar reference characters refer to similar parts throughout the several views of the drawings.

Referring now to Figure 2 of these drawings, there is illustrated at 10 a rigid pipe, and it may here be noted that the term "pipe" is broadly used to denote vessels of various forms to which this invention is applicable.

This pipe 10 has positioned therein a lining 11, the composition of which and the method of application of which will hereinafter be dealt with in detail. It may be noted, however, that this lining or inner member is compressible and that by the term "compressible" is meant a characteristic by virtue of which the body so defined is adapted to suffer an actual and appreciable reduction in total volume upon being subjected to a compressive stress. This compressibility is preferably achieved either by incorporating closed air or gas pockets in the body of a single material, or by employing a filler material with a binder; in which filler, for example cork, there are comprised air pockets of such structure as will result in compressibility as above defined.

This compressible material is preferably formed as above set forth as a lining of substantially uniform cross-section which may if desired be held in place by a separate adhesive coating as at 12.

The proportions or thickness of this lining are such, having due regard for its compressibility that it is repeatedly compressible to an extent which is as great or greater than the expansion due to freezing of the contents of the pipe. In other words, if the pipe be for example of the usual cylindrical form, any given unit of length of the pipe with its lining will be capable of increasing its volume by compressibility of the lining to an amount which is at least equal to the increase of volume of water filling such unit of length upon freezing and without endwise displacement. Also the material as a whole should be sufficiently elastic to so far resume its original form after compression as will permit it to accommodate repeated expansions due to repeated freezings.

As one form of material for lining, I propose a composition comprising a binder material and a filler material. The binder material may be formed of asphalt with asphaltite, such as gilsonite, added to raise its boiling point, to which is added sufficient coal tar or petroleum solvent to render it viscous or fluid to the desired degree. Also there is preferably mixed with the asphaltite a small amount of oil, preferably an oxidizing organic oil such as linseed oil, which may act as a softener. Also and if desired, a small percentage of a drier such as Prussian blue may be added to improve the drying property of the resultant mixture. The filler is preferably formed of ground cork, the fineness of which may be perhaps about that of ordinary granulated sugar, although good results may be obtained with a coarser or finer cork. After grinding the cork, the finest of the resultant material is preferably sifted out and discarded, as it will be found to contain a large proportion of relatively incompressible material such as occurs throughout the body of the unground cork.

As is well known, the substance cork contains in itself a large number of air cells isolated one from another, and the volume of which may be reduced on compression of the material. I also preferably use in the filler a small proportion of a fibrous substance such as asbestos which adds to the strength of the resistant material especially when it is used in thick coatings. These substances are thoroughly mixed, preferably under the influence of heat and preferably to such an extent that each particle of cork, and asbestos if it be used, is coated with the binder.

The lining may be applied as follows. If desired, a thin coating of the clear binder is first applied to the inner surface of the rigid iron pipe 10. This however is not strictly necessary. Then the material comprising the binder and filler, mixed as above, is placed in a vat as shown at 13 in Figure 3 of the drawings, and the vat heated, as indicated by the burner 14. The pipe 10 is then inserted within a tight-fitting outer casing 15, the lower end of which may be inturned to provide the shoulder 16. The entire pipe with its casing is then dipped within the vat 13 until its inner surface is thoroughly coated, whereupon it is removed and withdrawn from the casing 15 which may be repeatedly used for successive pipes. During this operation the temperature of the pipe 10 is preferably considerably below that of the material into which it is dipped in order to cause the desired thickness to adhere. After the pipe 10 is removed, it may be heated to a slight degree and placed on a horizontal support and rolled, to give a more uniform disposition of its lining. Also if desired, a mandrel coated with a substance to prevent adhesion, may be inserted to fit within the lining and smooth its inner surface. Neither of these latter steps appears however to be essential, and it is to be understood that many of the features of this invention may be attained by introducing the material within the pipe in another manner, such as pouring it inside the same and subsequently rolling it in a substantially horizontal or slightly inclined position.

If a secure adhesion of the lining to the inner surface of the pipe is desired, it is sometimes expedient to clean this inner surface before the pipe is treated.

It is also to be noted that the pipe with its lining is preferably thoroughly dry before being put into use, this drying being hastened by the use of heat.

It is to be understood that although there has been herein described somewhat in detail an illustrative embodiment of the mechanical features of this invention and an illustrative method of carrying on my art, nevertheless no single feature, either of embodiment or process, is to be considered as limiting other than as set forth in my claims, and the various individual features or steps are of independent value although possessing added advantage when combined with other features or steps.

I claim as my invention:—

1. In construction of pipes and the like, in combination, a pipe having therein a lining which comprises a filler material susceptible to a substantial reduction in volume under the influence of pressure, and a binder by which said filler material is held in position, said filler material being comminuted and intermingled with said binder.

2. In construction of pipes and the like, in combination, a pipe having therein a continuous molded lining through which are closed and relatively isolated air or gas chambers.

3. In construction of pipes and the like, in combination, a pipe having extending along its interior a body comprising cork, a fibrous substance, and binding means.

4. In construction of pipes and the like, in combination, a pipe having extending along its interior a member comprising ground cork and a binding substance with which said cork is intermingled.

5. In construction of pipes and the like, in combination, a pipe having extending along its interior a member comprising ground cork and a fibrous substance intermingled with a binding substance and capable of sufficient reduction in volume under pressure to accommodate the expansion of water filling said pipe upon freezing.

6. In construction of pipes and the like, in combination, a rigid pipe having a lining comprising ground cork, a fibrous substance and a binder with which said cork and fibrous substance are intermingled and by which they are held in position.

7. In construction of pipes and the like, in combination, a rigid pipe having extending along the same a member formed of a substance susceptible to substantial reduction in volume under the influence of pressure ground and intermingled with an elastic binder.

8. In construction of pipes and the like, in combination, a rigid pipe having extending along the same a member formed of a substance susceptible to substantial reduction in volume under the influence of pressure ground and intermingled with an elastic binder, said member being formed into a lining along the walls of the pipe.

9. In construction of pipes and the like, in combination, a rigid pipe having therein a lining comprising a substance susceptible to substantial reduction in volume under the influence of pressure ground and intermingled with an elastic binder.

10. In construction of pipes and the like, in combination, a rigid pipe having therein a lining comprising a substance susceptible to substantial reduction in volume under the influence of pressure ground and intermingled with a binder which includes asphalt in its composition.

11. In construction of pipes and the like, in combination, a rigid pipe having therein a lining comprising a substance susceptible to substantial reduction in volume under the influence of pressure ground and intermingled with a binder which includes in its composition asphalt and an oil.

12. In construction of pipes and the like, in combination, a rigid pipe having therein a lining comprising a ground substance susceptible to substantial reduction in volume under the influence of pressure and a fibrous substance, both intermingled with a binder which includes in its composition asphalt and an oil.

13. In construction for pipes and the like, a water pipe having therein a lining of cork of sufficient thickness to be capable for a given unit of length of said pipe of a reduction in volume under pressure at least equal to the expansion of water filling such length of pipe upon freezing, and a material adhesive to said cork and insoluble in water securing said lining in place.

In testimony whereof, I have signed my name to this specification this 20th day of February, 1920.

OTTO G. LUYTIES.